United States Patent
Li et al.

(10) Patent No.: US 11,317,139 B2
(45) Date of Patent: Apr. 26, 2022

(54) CONTROL METHOD AND APPARATUS

(71) Applicant: Lenovo (Beijing) Co., Ltd., Beijing (CN)

(72) Inventors: Yang Li, Beijing (CN); Haibin Ke, Beijing (CN)

(73) Assignee: LENOVO (BEIJING) CO., LTD., Beijing (CN)

(*) Notice: Subject to any disclaimer, the term of this patent is extended or adjusted under 35 U.S.C. 154(b) by 25 days.

(21) Appl. No.: 16/834,717

(22) Filed: Mar. 30, 2020

(65) Prior Publication Data

US 2020/0314482 A1    Oct. 1, 2020

(30) Foreign Application Priority Data

Mar. 31, 2019  (CN) .......................... 201910254410.1

(51) Int. Cl.
*H04N 21/431*  (2011.01)
*H04N 21/466*  (2011.01)

(52) U.S. Cl.
CPC ..... *H04N 21/4312* (2013.01); *H04N 21/4667* (2013.01)

(58) Field of Classification Search
None
See application file for complete search history.

(56) References Cited

U.S. PATENT DOCUMENTS

| | | | |
|---|---|---|---|
| 10,163,173 B1 | 12/2018 | McKinley et al. | |
| 2006/0120692 A1* | 6/2006 | Fukuta | H04N 5/907 386/230 |
| 2009/0089712 A1* | 4/2009 | Sato | G06F 3/0482 715/838 |
| 2012/0093476 A1* | 4/2012 | Mountain | H04N 9/8227 386/230 |
| 2015/0302889 A1* | 10/2015 | Chung | G11B 27/34 715/723 |
| 2019/0200089 A1* | 6/2019 | Pio | H04N 21/47217 |

FOREIGN PATENT DOCUMENTS

| | | |
|---|---|---|
| CN | 104010197 A | 8/2014 |
| CN | 104185073 A | 12/2014 |
| CN | 105100961 A | 11/2015 |
| CN | 105704559 A | 6/2016 |
| CN | 106021434 A | 10/2016 |
| CN | 106572380 A | 4/2017 |
| CN | 106658141 A | 5/2017 |
| CN | 107872729 A | 4/2018 |
| CN | 108600781 A | 9/2018 |
| CN | 108965922 A | 12/2018 |
| JP | S63274907 A | 11/1988 |

* cited by examiner

*Primary Examiner* — Heather R Jones
(74) *Attorney, Agent, or Firm* — Anova Law Group, PLLC

(57) ABSTRACT

Embodiments of the present disclosure provides a control method. The method includes acquiring a playback instruction for a first video, the playback instruction including first identification information of a first thumbnail in a cover of the first video, the cover of the first video including a plurality of thumbnails, and each thumbnail corresponding to one of a plurality of scenes included in the first video; determining a first scene corresponding to the first thumbnail; and playing the first video from a position corresponding to the first scene.

11 Claims, 7 Drawing Sheets

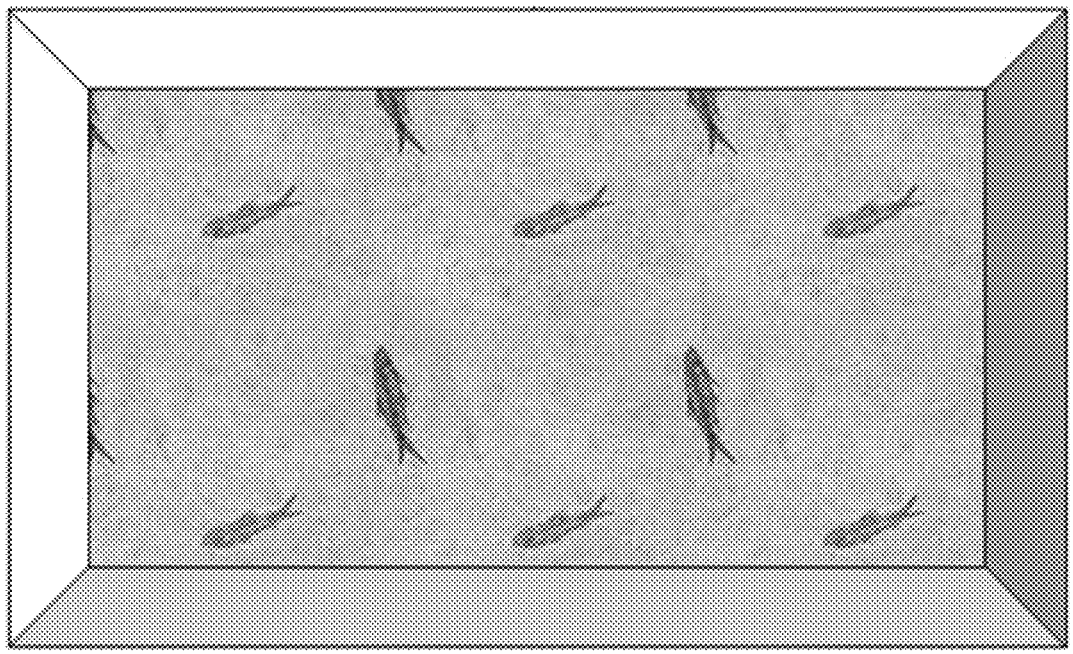

FIG. 1

```
┌─────────────────────────────────────────────────┐
│ Acquiring a playback instruction for a first    │
│ video, the playback instruction includes first  │
│ identification information of a first thumbnail │
│ in a cover of the first video, the cover of the │ ─ 201
│ first video including a plurality of thumbnail, │
│ and each thumbnail corresponding to one of a    │
│ plurality of scenes included in the first video │
└─────────────────────────────────────────────────┘
                        │
                        ▼
┌─────────────────────────────────────────────────┐
│ Determining a first scene corresponding to the  │ ─ 202
│                 first thumbnail                 │
└─────────────────────────────────────────────────┘
                        │
                        ▼
┌─────────────────────────────────────────────────┐
│ Playing the first video from a position         │ ─ 203
│ corresponding to the first scene                │
└─────────────────────────────────────────────────┘
```

FIG. 2

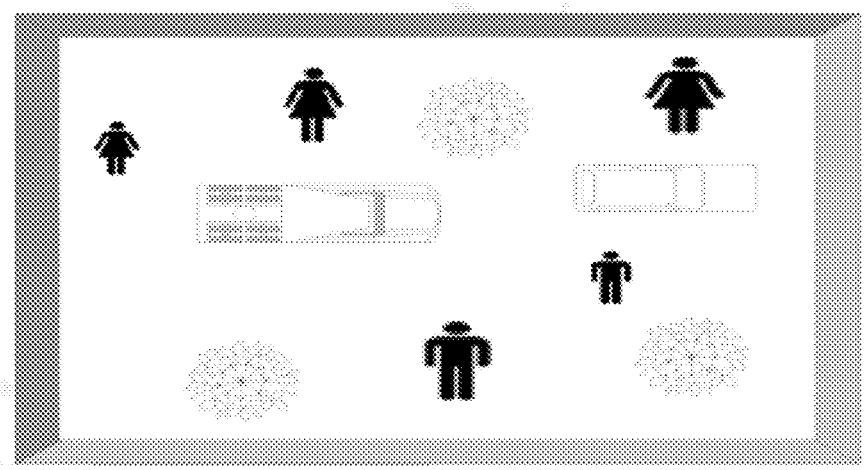

FIG. 6 (b)

Acquiring a playback instruction for a first video, the playback instruction including first identification information of a first thumbnail in a cover of the first video, the cover of the first video including a plurality of thumbnail, and each thumbnail corresponding to one of a plurality of scenes included in the first video ——201

Determining a first scene corresponding to the first thumbnail ——202

Playing the first video from a starting position of the first scene ——2031

FIG. 7

CONTROL METHOD AND APPARATUS

CROSS-REFERENCES TO RELATED APPLICATION

This application claims priority to Chinese Patent Application No. 201910254410.1, entitled "Control Method and Apparatus," filed on Mar. 31, 2019, the entire content of which is incorporated herein by reference.

FIELD OF TECHNOLOGY

The present disclosure relates to the field of video applications and, more specifically, to a control method and apparatus.

BACKGROUND

With the development of internet technologies and mobile networks, the use of video files (e.g., the videos provided by an application installed on the terminal or the videos stored locally on the terminal, etc.) on terminal devices, such as computers or mobile phones, has increased. Likewise, the demand for video files has also increased.

In many cases, the cover image of the video file cannot provide users with useful file content information, and it is difficult to quickly locate the point of interest in the video, as such, the user's needs cannot be served.

BRIEF SUMMARY OF THE DISCLOSURE

One aspect of the present disclosure provides a control method. The method includes acquiring a playback instruction for a first video, the playback instruction including first identification information of a first thumbnail in a cover of the first video, the cover of the first video including a plurality of thumbnails, and each thumbnail corresponding to one of a plurality of scenes included in the first video; determining a first scene corresponding to the first thumbnail; and playing the first video from a position corresponding to the first scene.

Another aspect of the present disclosure provides a control apparatus. The apparatus includes a processor and a memory storing one or more sets of instruction sets that, when executed by the processor, causes to the processor to: acquire a playback instruction for a first video, the playback instruction including first identification information of a first thumbnail in a cover of the first video, the cover of the first video including a plurality of thumbnails, and each thumbnail corresponding to one of a plurality of scenes included in the first video; determine a first scene corresponding to the first thumbnail; and play the first video from a position corresponding to the first scene.

Another aspect of the present disclosure provides a computer readable medium. The computer readable medium contains program instructions for causing a computer to perform the method of: acquiring a playback instruction for a first video, the playback instruction including first identification information of a first thumbnail in a cover of the first video, the cover of the first video including a plurality of thumbnails, and each thumbnail corresponding to one of a plurality of scenes included in the first video; determining a first scene corresponding to the first thumbnail; and playing the first video from a position corresponding to the first scene.

BRIEF DESCRIPTION OF THE DRAWINGS

In order to provide a clearer illustration of various embodiments of the present disclosure or technical solutions in conventional technology, the drawings used in the description of the disclosed embodiments or the conventional technology are briefly described below. The following drawings are merely embodiments of the present disclosure. Other drawings may be obtained based on the disclosed drawings by those skilled in the art without creative efforts.

FIG. 1 is a diagram of the effect of a video cover in conventional technology;

FIG. 2 is a flowchart of a control method according to an embodiment of the present disclosure;

FIGS. 6(a) and 6(b) are example diagram of the effect of setting the size of a scene thumbnail based on a duration;

FIGS. 7-9 are flowcharts of the control method according to an embodiment of the present disclosure;

DETAILED DESCRIPTION

Figure 3:
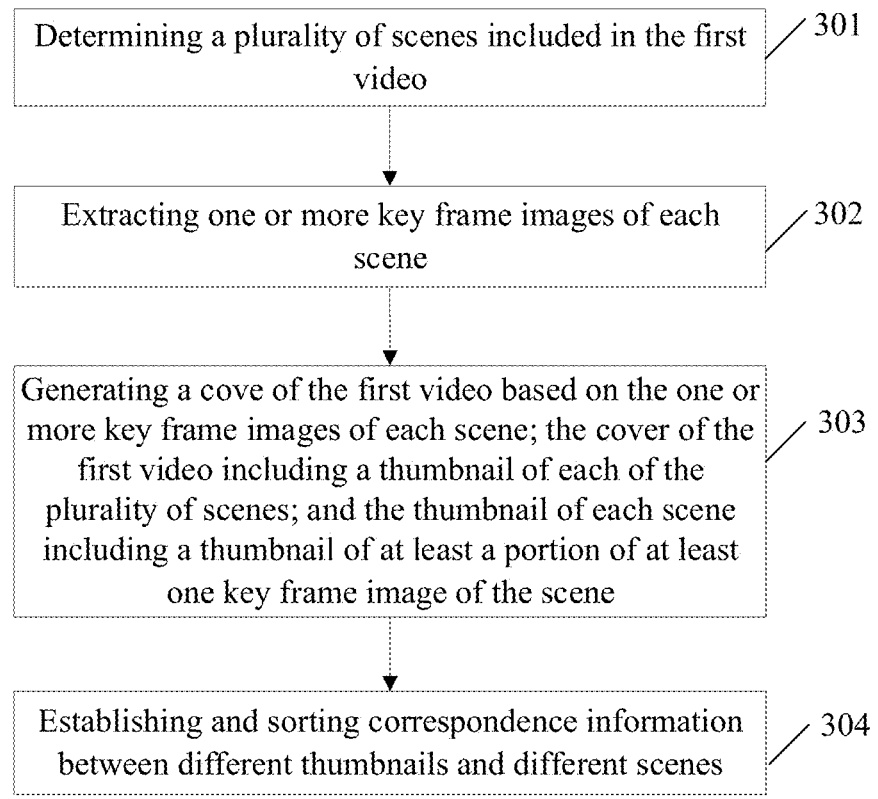
FIG. 3 is a flowchart of a pre-processing process of the control method according to an embodiment of the present disclosure.

Technical solution according to various disclosed embodiments is described below with reference to the drawings. The described embodiments are merely some of embodiments of the present disclosure, but not all embodiments of the present disclosure. Other embodiments obtained based on the disclosed embodiments by those skilled in the art without creative efforts are within the scope of the present disclosure.

The present disclosure provides a control method and apparatus. The method and apparatus are suitable for, but not limited to, playing control of video files (e.g., the videos provided by an application installed on the terminal or the videos stored locally on the terminal, etc.) on a computer or a terminal device, such as a mobile phone, a tablet, a personal digital assistant, etc. The control method and apparatus of the present disclosure will be described in detail below through specific embodiments.

FIG. 2 is a flowchart of a control method according to an embodiment of the present disclosure. The method will be described in detail below.

201, acquiring a playback instruction for a first video, the playback instruction includes first identification information of a first thumbnail in a cover of the first video, the cover of the first video includes a plurality of thumbnail, and each thumbnail corresponds to one of a plurality of scenes included in the first video.

The first video may be, but is not limited to, a video file on a computer or a terminal device, such as a mobile phone, a tablet, or a personal digital assistant. For example, the video file may be a video provided by an application installed on the terminal or a video stored locally on the terminal, etc.

The scenes included in the first video may include, but are not limited to, the following types.

1) The scenes acquired by segmenting/dividing the video file based on the video image content, where each video segment acquired after segmentation/division may be used as a scene of the video.

More specifically, the image content of the video may be acquired by identifying spatial information, object (e.g., images, animals and plants, people, etc.) information, and behavior/action of objects in the video. The video file may be further segmented/divided based on the image content of the video to acquire multiple scenes of the video divided by the image content.

2) The scene acquired by segmenting/dividing the video file based on the background music of the video.

Similarly, for videos with different background music in different time periods, the video files can be segmented/divided based on the background music. More specifically, each continuous image corresponding to the same background music can be divided into the same scene, and the same background music may be, but not limited to, the same song, the same music, etc.

3) The scene acquired by segmenting/dividing the video file based on time.

Similarly, each video segment acquired after segmentation/division can be used as a scene of the video.

In some embodiments, the video may be evenly segmented/divided into multiple equal-length video segments based on a predetermined duration (of course, the duration of the last video segment may be less than or equal to the predetermined duration based on the actual duration of the video and the set duration). Each video segment may be a scene of the video. In some embodiments, the video may be randomly segmented/divided into multiple unequal length video segments, and each video segment may be used as a scene of the video.

Different from the conventional technology in which the video cover only includes a pre-designed thumbnail icon or a single image, in the present disclosure, a plurality of thumbnails corresponding to different scenes in the video may be provided in the video cover. That is, the video cover can carry thumbnails corresponding to different scenes in the video, allowing users to understand the various scenes included in the video based on the thumbnails displayed on the video cover, and at the same time, supporting user to index the corresponding scenes in the video by using the thumbnails in the video cover as an index.

As such, when the user needs to play the first video, the user can first understand the various scenes included in the first video holistically from the thumbnails corresponding to different scenes displayed in the video cover of the first video. Subsequently, a certain thumbnail, such as the first thumbnail, in the cover of the first video may be selected and operated (e.g., click, double-click, press-and-hold, etc.) based on actual requirements to trigger a playback instruction for the first video.

For the terminal device, the device side can correspondingly acquire the above-mentioned playback instruction triggered by the user by operating on the thumbnail in the first video cover. Different from the playback instruction triggered by the user by operating on the icon or cover of the video in the conventional technology, in the embodiments of the present disclosure, the playback instruction triggered by the user by operating on the first thumbnail in the first video cover may include at least the first identification information of the first thumbnail, which may include the ID (identity), number, and/or name of the first thumbnail, thereby supporting the subsequent indexing and positioning of the corresponding scene in the first video based on the thumbnail identification information in the instruction.

202, determining a first scene corresponding to the first thumbnail.

After acquiring the playback instruction described above, the playback instruction may be parsed to obtain the thumbnail identification information carried therein, that is, the first identification information of the first thumbnail. As such, the first scene corresponding to the first thumbnail may be determined based on the first identification information obtained through parsing, and the pre-established and stored correspondence information between the thumbnail identification and the scene.

203, playing the first video from a position corresponding to the first scene.

After the first scene corresponding to the first thumbnail is determined, the first scene may be further located in the first video. Therefore, the first video may be played from the position corresponding to the first scene, and the video may no longer be played from the starting position of the video by default as in the conventional technology.

It can be seen from the above technical solution, in the control method provided in the embodiment of the present disclosure, by providing a plurality of thumbnails corresponding to different scenes included in the video in the video cover, when the playback instruction carrying a certain thumbnail identification information in the video cover is acquired, the corresponding scene in the video may be located based on the thumbnail identification information carried in the playback instruction. As such, the video may be played from the located scene. It can be seen that compared with the conventional technology, the present disclosure effectively expands the cover information of a video by providing a plurality of thumbnails corresponding to different scenes of the video in the video cover, and supports users to index the corresponding scene in the video by using the thumbnails in the video cover as an index. As such, the content of the video may be richer and more comprehensive, and the playback of the video may be more flexible, convenient, and better meet the needs of the users.

The implementation and execution of the control method described above is based on the generated video file cover and the established and stored correspondence between different thumbnails in the video cover and different scenes of the video. As such, referring to FIG. 3, the above-mentioned control method provided in the present disclosure may further include a pre-processing process described below.

301, determining a plurality of scenes included in the first video.

The first video may be, but is not limited to, a video file on a computer or a terminal device such as a mobile phone, a tablet, or a personal digital assistant, such as a video file provided by an application installed on the terminal device or a video file stored locally on the terminal.

The first video may be segmented/divided based on the image content, background music, or time of the first video, and each video segment obtained by the segmentation/division may be a scene of the first video.

For the method for segmenting/dividing the first video based on the image content of the first video to obtain a scene of the first video, techniques such as basic image analysis, image processing (e.g., color analysis, grayscale analysis, image edge detection, etc.), and/or deep learning (e.g., deep learning based on convolutional network models) may be used. Pattern recognition may be performed on the video images of the first video to identify spatial information, object information (such as scenery, animals and plants, people, even text in the images, etc.) and/or behavior and movements of the objects included in the video images.

Subsequently, the first video may be further segmented based on the identified image content such as the spatial information, object information, and/or behavior and movements of the objects. In some embodiments, the first video may be divided into a plurality of video segments based on the division logic of continuous video images with high content similarity/relevance in the same scene, and each video segment may be used as a scene of the first video.

For example, assuming that each image included in video A (such as various short videos produced and uploaded by a typical user) from the starting time of $t_0$ to time $t_1$ is mainly an image of a person Person1 or a beach, each image included from time $t_1$ to time $t_2$ is mainly an image of a person Person2 or a desert, and each image included from time $t_2$ to time $t_3$ (ending time) is mainly an image of a person Person3 or ancient buildings. Based on the pattern recognition of video A, the video A can be divided into three video segments corresponding to Person1, Person2, and Person3, respectively, based on the similarity or relevance between the image contents and using the times $t_1$ and $t_2$ as the segmentation points. Alternatively, the he video A can be divided into three video segments corresponding to the beach, desert, and the ancient buildings, and each video segment may be used as a scene of the video A. As such, the video A may be divided into three scenes.

In another example, assuming that each image included in video B (such as a TV series) from the starting time $t_0$ to the time $t_1$ is a prologue image (the prologue can be identified based on the text area characteristics of the video image or the background music), from the time $t_1$ to time $t_2$, multiple images are mainly used to present scene information, from the time $t_2$ to time $t_3$, multiple images are mainly used to present the indoor plot of multiple characters, from time $t_3$ to time $t_4$, multiple images are mainly used to present the indoor plot of two characters/single character, from time $t_4$ to time $t_5$, multiple images mainly used to present the outdoor plot of two characters/single character, and from time $t_5$ to time $t_6$, images are the epilogue images. Based on the pattern recognition of video B, the video B can be divided into six video segments corresponding to the prologue, scene information, multiple characters indoor, two characters/single character indoor, two characters/single character outdoor, and epilogue, respectively, based on the similarity or relevance between the image contents and using the times $t_1$, $t_2$, $t_3$, $t_4$, $t_5$, and $t_6$ as the segmentation points, where each video segment may be used as a scene of the video B.

For the method of segmenting/dividing the first video based on the background music to obtain the scenes of the first video, in some embodiments, each continuous image corresponding to the same song or the same musical piece can be divided into the same scene.

For the method of segmenting/dividing the first video based on the time to obtain the scenes of the first video, in some embodiments, the first video can be averagely segmented/divided into multiple equal-length video segments based on a predetermined duration (of course, the duration of the last video segment can be less than or equal to the set duration, which may depend on the actual duration of the first video and the set duration). Alternatively, the first video can be randomly segmented/divided into multiple unequal-length video segments, and each video segment may be used as a scene of the first video.

It should be noted that the division methods described above for scene division of the first video are merely examples, instead of limitative descriptions, provided to describe the content of the technical solution provided in the present disclosure. When implementing the present disclosure, the first video may also be divided in other ways, which is not limited in the present disclosure.

302, extracting one or more key frame images of each scene.

After determining the plurality of scenes includes in the first video based on the scene division, one or more key frame images of each scene of the first video may be extracted.

The key frame image of the scene is generally an image that includes more effective information related to the scene and can directly reflect the main content of the scene. Taking the scene that is mainly used to present the indoor plot of multiple characters as an example, at least one image in the scene can be selected as a key frame image of the scene (in fact, the scene is often mixed with other images, such as indoor layout images, close-up images of one person among multiple characters, etc.). Taking the scene that is mainly used to present a photo of a character as an example, at least one image in the scene including the front face of the character may be selected as the key frame image of the scene.

303, generating a cove of the first video based on the one or more key frame images of each of the plurality of scenes.

The cover of the first video may include a thumbnail of each of the plurality of scenes, and the thumbnail of each scene may include a thumbnail of at least a portion of at least one key frame image of the scene.

In some embodiments, for each scene of the first video, the thumbnail processing of one or more key frame images of the scene may be performed first, and the thumbnails obtained after the thumbnail processing of the one or more key frame images may be stitched to obtain the thumbnail of the scene. Subsequently, thumbnails of each scene of the first video may be further stitched to obtain a cover image of the first video.

For the cover effect of the video cover generated based on the method described above, reference may be made to FIG. 4(a) and FIG. 4(b). The video cover shown in FIG. 4(a) includes a total of 9 scene thumbnails corresponding to the 9 scenes of the video, respectively, and each scene thumbnail includes a thumbnail of a key frame image. The video cover shown in FIG. 4(b) includes a total of 3 scene thumbnails, where a scene thumbnail 401 is composed of one key frame image, a scene thumbnail 402 is composed of two key frame images, and a scene thumbnail 403 is composed of 5 key frame images. Subsequently, users can perform the specified operations in any area of the corresponding scene thumbnail in FIG. 4(a) and FIG. 4(b) to achieve the indexing and positioning of the scene corresponding to the scene thumbnail, thereby realizing the play of the video from the position corresponding to the scene.

Figure 4A:
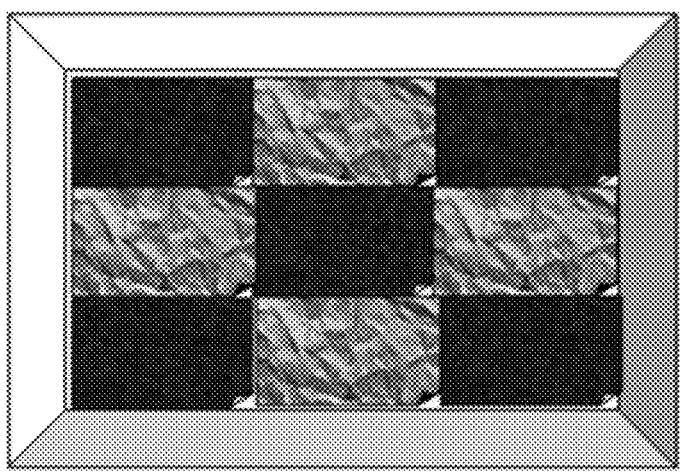
FIGS. 4(a) and 4(b) are example diagrams of the effect of a cover generated based on a key frame image thumbnail according to another embodiment of the present disclosure.
Figure 4B:
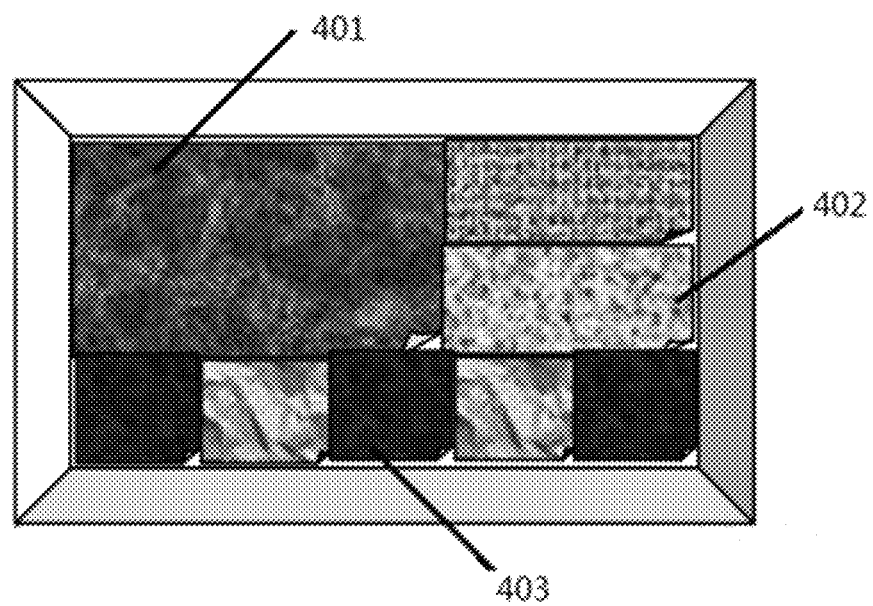

For the video cover effect shown in FIG. 4(b), in one specific implementation, a plurality of different key frame image thumbnails in the same scene thumbnail can be set to have the same indexing and positioning function. That is, users may perform the specified operation in the thumbnail area of any key frame image in the same scene thumbnail, and index and position the video to the scene position corresponding to the scene thumbnail in the video without distinction. Alternatively, a plurality of different key frame image thumbnails in the same scene thumbnail may be set to have different indexing and positioning functions. More specifically, for example, the scene corresponding to the same scene thumbnail may be further divided into multiple sub-scenes, and each key frame image thumbnail may correspond to each sub-scene. As such, users may correspondingly position different sub-scenes of the scene thumbnail corresponding to the scene by operating on different key frame image thumbnails in the same scene thumbnail. For the former implementation, since different key frame image thumbnails in the same scene have the same indexing function, each key frame image corresponding to the same scene thumbnail can be either a multi-frame continuous image adjacent in time, or a multi-frame non-continuous image with a certain time interval in the video. For the latter implementation, since different key frame image thumbnails in the same scene may have different indexing functions for indexing and positioning different sub-scenes in the corresponding scene, as such, each key frame image corresponding to the same scene thumbnail may be generally a multi-frame non-continuous image with a certain time interval. In some embodiments, an image that can directly reflect the main content of the sub-scene and include more effective information related to the sub-scene can be selected as the key frame image of the sub-scene.

In some embodiments, for each scene of the first video, a key foreground subject of the scene may also be extracted from the one or more key frame images of the scene, and the key foreground subject may be reduced to obtain a thumbnail of the scene. Subsequently, the key foreground subject in the thumbnails of each scene may be superimposed on a predetermined background image to obtain the cover of the first video.

In some embodiments, the key foreground subject may be extracted from the key frame image of the scene, such as the foreground person/animal image, the foreground car image, or the foreground building image, etc. in the key frame image based on the matting technology.

Figure 5A:
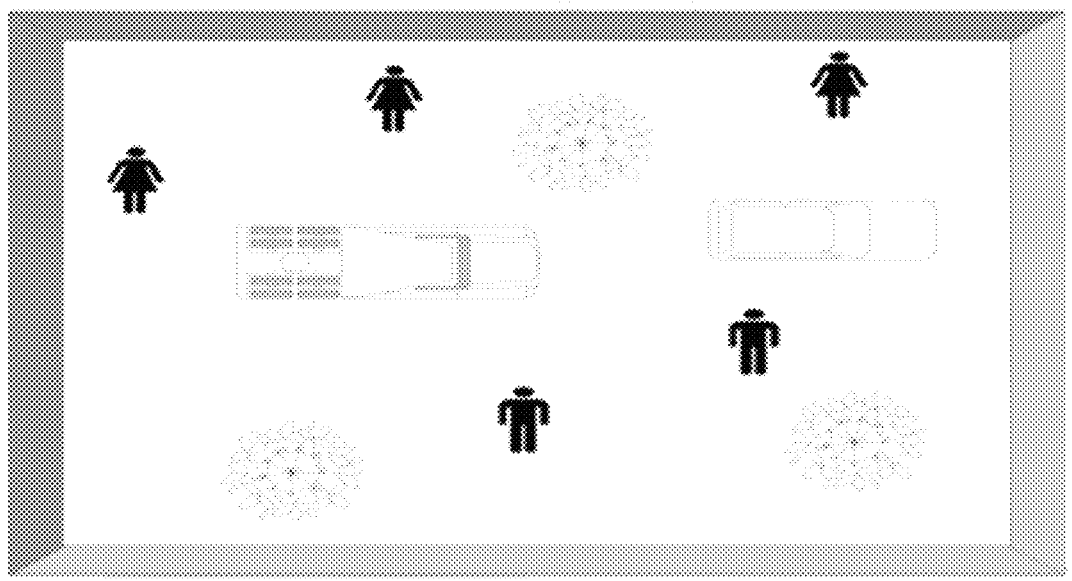
FIGS. 5(a) and 5(b) are example diagrams of the effect of the cover generated based on a key foreground subject thumbnail according to an embodiment of the present disclosure.

For the cover effect of the video cover generated based on the method described above, reference may be made to FIG. 5(a) and FIG. 5(b). The video cover shown in FIG. 5(a) includes a total of 7 scene thumbnails (the flowers in FIG. 5(a) are the image content of the background image) corresponding to the 7 scenes of the video, respectively, and each scene thumbnail includes a key foreground subject of a key frame image. The video cover shown in FIG. 5(b) includes a total of 3 scene thumbnails, where a scene thumbnail 501 is composed of key foreground subjects of 4 key frame images, a scene thumbnail 502 is composed of key foreground subjects of 2 key frame images, and a scene thumbnail 503 is composed of key foreground subjects of 4 key frame images. The rest of the cover is the image content provided by the background image. Subsequently, users can perform the specified operations in any area (or any key foreground subject area) of the scene thumbnail in FIG. 5(a) and FIG. 5(b) to achieve the indexing and positioning of the scene corresponding to the scene thumbnail, thereby realizing the play of the video from the position corresponding to the scene.

Figure 5B:
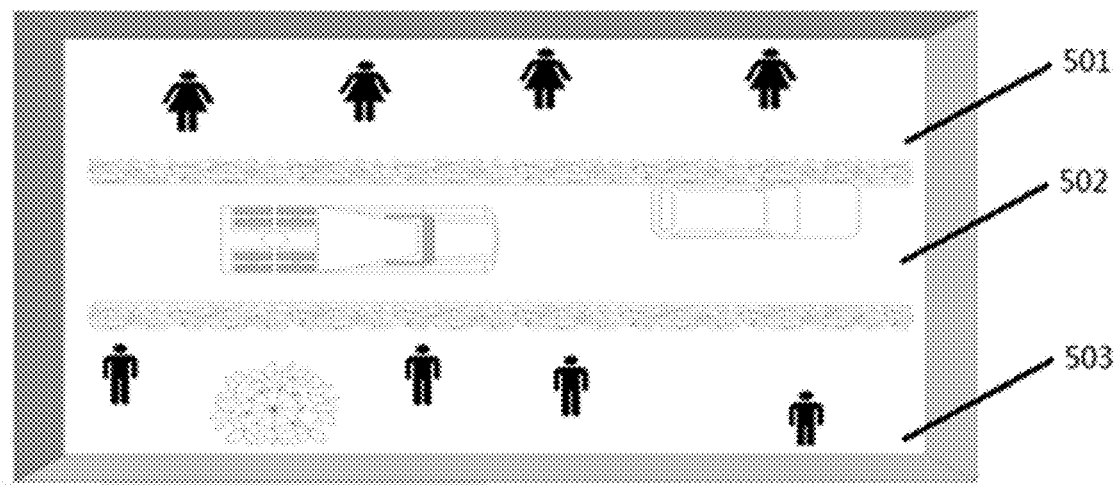

Similar to the two implementations corresponding to FIG. 4(b), for the video cover effect shown in FIG. 5(b), in one specific implementation, a plurality of different key foreground subjects in the same scene thumbnail can be set to have the same indexing and positioning function. That is, users may perform the specified operation in any key foreground subject area in the same scene thumbnail, and index and position the video to the scene position corresponding to the scene thumbnail in the video without distinction. Alternatively, a plurality of different key foreground subjects in the same scene thumbnail may be set to have different indexing and positioning functions. More specifically, for example, the scene corresponding to the same scene thumbnail may be further divided into multiple sub-scenes, and each key foreground subject may correspond to each sub-scene. As such, users may correspondingly position different sub-scenes of the scene thumbnail corresponding to the scene by operating on different key foreground subjects in the same scene thumbnail. For the former implementation, since different key foreground subjects in the same scene have the same indexing function, each key frame image corresponding to each key foreground subject in the same scene thumbnail can be either a multi-frame continuous image adjacent in time, or a multi-frame non-continuous image with a certain time interval in the video. For the latter implementation, since different key foreground subjects in the same scene may have different indexing functions for indexing and positioning different sub-scenes in the corresponding scene, as such, each key frame image corresponding to each key foreground subject in the same scene thumbnail may be generally a multi-frame non-continuous image with a certain time interval. In some embodiments, an image that can directly reflect the main content of the sub-scene and include more effective information related to the sub-scene can be selected as the key frame image of the sub-scene.

In other embodiments of the present disclosure, the size of the thumbnail of the scene/sub-scene in the video cover may be set based on the corresponding length of each divided scene/sub-scene in the video. In particular, in order to make it easier for users to understand the duration of each scene/sub-scene, the thumbnail size of each scene/sub-scene may be set to match the corresponding duration of the scene/sub-scene in the video. That is, the longer the duration of the scene/sub-scene in the video, the larger the corresponding thumbnail size in the video cover. Conversely, the shorter the duration of the scene/sub-scene in the video, the shorter the corresponding thumbnail size in the video cover.

Figure 6A:
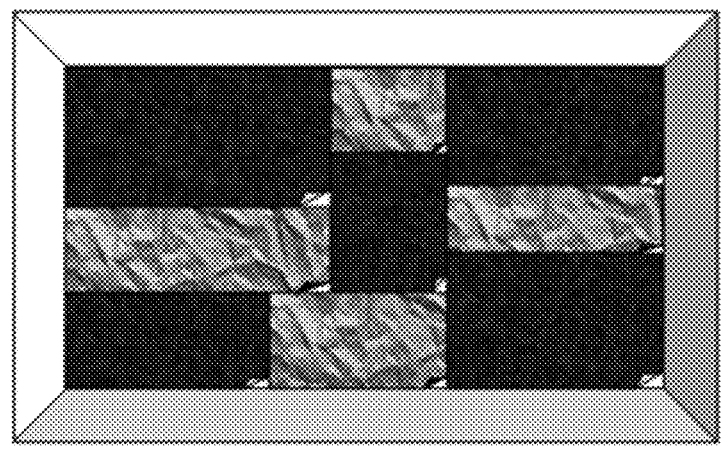

FIG. 6(a) and FIG. 6(b) are example diagram of the effect of setting the size of a scene thumbnail based on a duration for the above-mentioned embodiments of FIG. 4(a) and FIG. 5(a), respectively. For the cases where the scene thumbnail further includes multiple key frame image thumbnails/multiple key foreground subject thumbnails, that is, the implementations of FIG. 4(b) and FIG. 5(b). Similar to the effect of setting the thumbnail size of the scene based on the duration shown in FIG. 6(a) and FIG. 6(b), the only difference is that after the size of the scene thumbnail is set based on the duration of the scene, the size of the thumbnail (e.g., the key frame image thumbnail or the key foreground subject thumbnail) corresponding to the sub-scene of the scene may be further set based on the duration of the sub-scene, the diagrams of which are not shown in the present disclosure.

In addition, in some embodiments, it may not be necessary to set the size of the scene/sub-scene thumbnail in the video cover based on the duration, but to mark the specific duration of the scene/sub-scene in the thumbnail area of each scene/sub-scene, such as 10' (10 minutes), 10'56" (10 minutes and 56 seconds). This method can also provide users with the duration information of the scene/sub-scene in the video cover. Of course, the two methods described above can also be combined, that is, on the basis of setting the size of the scene/sub-scene thumbnail in the video cover based on the duration, the specific duration corresponding to the scene/sub-scene may be further marked in the thumbnail area of each scene/sub-scene.

Based on the duration information display method described above, users can not only understand the relevant content information of each scene in the video through the thumbnails of the key frame images/key foreground subjects shown in the video cover, but also use the thumbnail size of the scene/sub-scene in the video cover to understand the duration information of the scene/sub-scene in the video.

The foregoing thumbnail display method or duration information display method provided in the previous embodiments are merely exemplary descriptions to clearly describe the technical solution of the present disclosure. The specific implementation of the present disclosure is not limited to the foregoing implementation methods shown in the present disclosure.

304, establishing and sorting correspondence information between different thumbnails and different scenes.

After generating the video cover including a plurality of scene/sub-scene thumbnails for the first video, the correspondence information between thumbnails of different scenes/sub-scenes and different scenes/sub-scenes included in the video cover may be further established, and the correspondence information of the established thumbnails and scenes/sub-scenes may be stored. Subsequently, after the playback instruction for the first video is triggered for the thumbnail in the video cover, the "playback position corresponding to the playback instruction to play the video" can be positioned in the first video based on the established and stored correspondence information.

The correspondence information may include, but is not limited to, a correspondence between a thumbnail identifier, such as a thumbnail ID, a number, and/or a name, and a scene identifier, such as a scene ID, a number, and/or a name.

Further, for the implementations corresponding to FIG. 4(a) and FIG. 5(a) described above, since each scene thumbnail in the video cover includes only one key frame image thumbnail or one key foreground subject thumbnail, it may be possible to specifically establish and store the correspondence information between "the scene thumbnail identifier and/or thumbnail identifier of key frame images in the scene thumbnails" and the scene identifier, or establish and store the correspondence information between "the scene thumbnail identifier and/or thumbnail identifier of key foreground subjects in the scene thumbnails" and the scene identifier.

For the implementations corresponding to FIG. 4(a) and FIG. 5(a) described above, for the implementation of the same index function for multiple different key frame image/key foreground subject thumbnails in the same scene thumbnail, the correspondence information between "the scene thumbnail identifier and/or thumbnail identifier of any one or more key frame images in the scene thumbnail" and the scene identifier can be established and stored. Alternatively, the correspondence information between "the scene thumbnail identifier and/or thumbnail identifier of any one or more key foreground subjects in the scene thumbnail" and the scene identifier can be established and stored. For the implementation of different indexing functions (indexed to different sub-scenes of the scene) for thumbnails of different key frame images/key foreground subjects in the same scene thumbnail, in some embodiments, a secondary index structure of the "thumbnail-scene" may be established and stored. In particular, the primary index may include the correspondence information between the scene thumbnail identifier and the scene identifier, the secondary index may include the correspondence information between the thumbnail identifier (or the thumbnail identifier of different key foreground subjects) of different key frame images in different scene thumbnails and different sub-scene identifiers.

By using the processing method described in the present embodiment, a cover including multiple scene thumbnails may be generated for the video in advance, and the corresponding relationship between each thumbnail in the video cover and the video scene may be established, which may effectively expand the cover information of the video. Users may learn more about the video file through the video cover. The video cover may support the user to index the corresponding scene in the video by using the thumbnail in the video cover as an index, such that users may quickly position the position of interest in the video.

The following embodiment provides a specific implementation process of step 203 of the control method (playing the first video from a position corresponding to the first scene).

In one implementation method, FIG. 7 illustrates a flowchart of the control method according to an embodiment of the present disclosure. More specifically, step 203 may be implemented by using the following step described in detail below.

2031, playing the first video from a starting position of the first scene.

In particular, for the implementation process of 201 and 202 in FIG. 7, reference may be made to the description of 201 and 202 provided above, which will not be repeated herein again.

After the first video is divided into multiple scenes, each scene in the first video may correspond to a starting position and an ending position (or it may be called the starting time and the ending time). After obtaining the playback instruction for the first video and determining the first scene corresponding to the first thumbnail identification information carried in the playback instruction, in some embodiments, the video playback action in response to the playback instruction may be indexed to the starting position of the first scene in the first video. That is, the first video may be played from the starting position of the first scene, and the part before the starting position of the first scene may be skipped.

Figure 8:
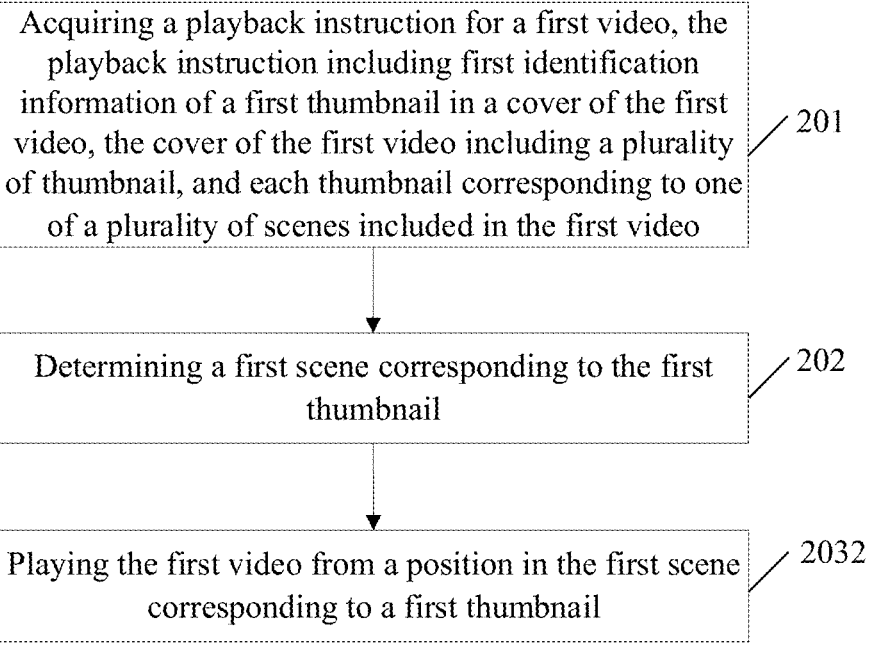

In another implementation method, FIG. 8 illustrates a flowchart of the control method according to an embodiment of the present disclosure. More specifically, step 203 may be implemented by using the following step described in detail below.

2032, playing the first video from a position in the first scene corresponding to a first thumbnail; each thumbnail included in the cover of the first video may be a thumbnail of at least a part of a key frame image in a corresponding scene of the first video.

For the implementation process of 201 and 202 in FIG. 8, reference may be made to the description of 201 and 202 provided above, which will not be repeated herein again.

Based on the foregoing description, it can be known that the thumbnail of at least part of the key frame image in the corresponding scene of the first video may be the thumbnail of the key frame image in the scene of the first video, or the thumbnail of the key foreground subject extracted from the key frame image. Therefore, each thumbnail included in the cover of the first video (which does not refer to the macro-level scene thumbnail) may correspond to a corresponding key frame image in the first video. Correspondingly, each thumbnail may also correspond to a corresponding image position/time position in the first video. Based on this characteristic, when a playback instruction is obtained and a target scene (i.e., the first scene) corresponding to the first thumbnail identification information carried in the playback instruction is determined, that is, the video playback action in response to the playback instruction may also be indexed to a position corresponding to the first thumbnail in the first scene. That is, the first video may be played from the image position/time position corresponding to the first thumbnail in the first scene, and the part before the image position/time position of the first thumbnail may be skipped.

Figure 9:
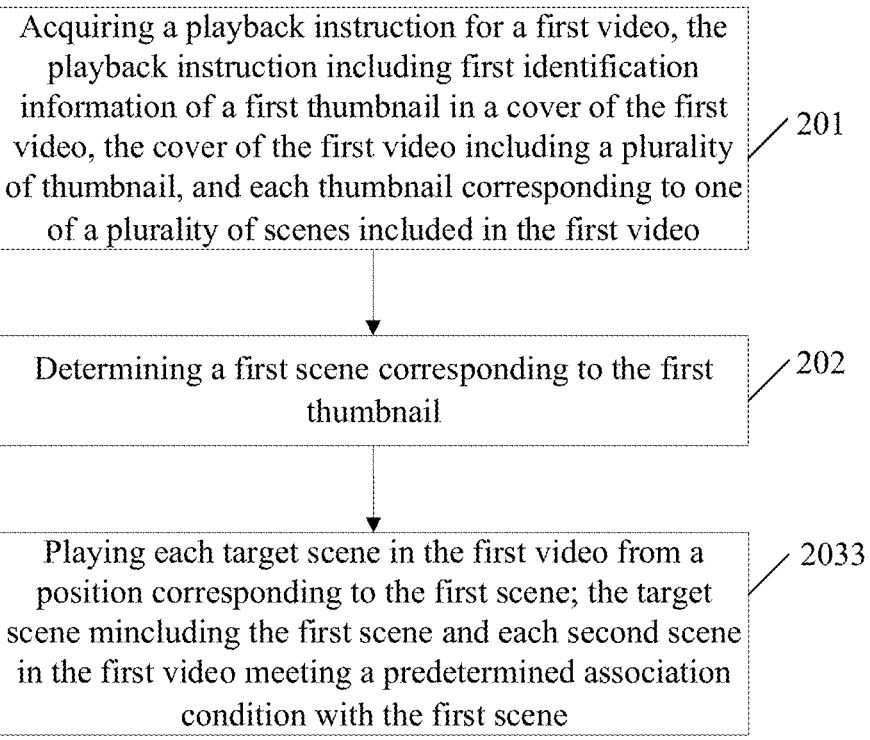

In yet another implementation method, FIG. 9 illustrates a flowchart of the control method according to an embodiment of the present disclosure. More specifically, step 203 may be implemented by using the following step described in detail below.

2033, playing each target scene in the first video from a position corresponding to the first scene; the target scene may include the first scene and each second scene in the first video meeting a predetermined association condition with the first scene.

For the implementation process of 201 and 202 in FIG. 9, reference may be made to the description of 201 and 202 provided above, which will not be repeated herein again.

The predetermined association condition may be, but is not limited to, a condition capable of indicating that the content has high similarity or relevance with the content of the first scene. In some embodiments, for example, if the second scene and the first scene belong to the same/similar category of scenes (e.g., the second scene and the first scene may be image display scenes of the same/similar person, or the second scene and the first scene may be both scene display scenes or war display scenes, etc.), the second scene may be determined to have a high similarity or relevance to the first scene.

In the two implementation methods provided in the foregoing embodiments of FIG. 7 and FIG. 8, when the first video is played in response to the playback instruction, the part of first video after the position may be continuous played without selection starting from the positioned position (e.g., the starting position of the positioned scene or the position of the thumbnail operated in the first video when the playback instruction is triggered). In the present embodiment, starting from the positioned position (which can also be the starting position of the positioned scene or the position of the thumbnail operated in the first video when the playback instruction is triggered), the first scene positioned in the first video and each second scene that meets the associated conditions of the first scene may be selectively played.

The method of selecting each second scene in the first video that meets the associated conditions with the first scene and selectively playing the first scene and each second scene is essentially a skipping playback of the first video. That is, the related scenes in the first video may be automatically connected and played back on the skipping method.

This playback method may be convenient for users to locate one scene of the video and continuously watch (starting with the located scene) other scenes (such as scenes of the same/similar category, etc.) in the video that are associated with the located scene. For example, assuming that a small video includes a plurality of images of character A from time $t_0$ to $t_1$ (corresponding to scene P1), a plurality of images of character B from time $t_1$ to $t_2$ (corresponding to scene P2), a plurality of images of character A from time $t_2$ to $t_3$ (corresponding to scene P3), and a plurality of images of character B from time $t_3$ to $t_4$ (corresponding to scene P4). Based on the present embodiment, after the user triggers a playback instruction on the video by operating on the thumbnail corresponding to the scene Pc on the cover of the video, in response to the playback instruction, playback may start from the position corresponding to scene P2, and after playback of scene P2 is completed, skip to the position of scene P4 to further play scene P4. That is, the similar scenes P2 and P4 may be screened, and the screened similar scenes P2 and P4 may be sequentially played using the skipping method. In another example, a video of a TV episode may include multiple non-continuous scenery scenes and multiple non-continuous character scenes. After the user triggers a playback instruction on the video by operating on the thumbnail corresponding to a scenery scene S1 on the cover of the video, in response to the playback instruction, starting from the scenery scene S1, the scenery scenes after S1 in the video may be played.

Based on the various positioning methods of the playback position provided in the present embodiment described above, the user may use the thumbnail in the video cover as an index to index the playback action of the video to the corresponding position of the desired scene, such that the use may quickly locate the position of interest in the video.

Figure 10:
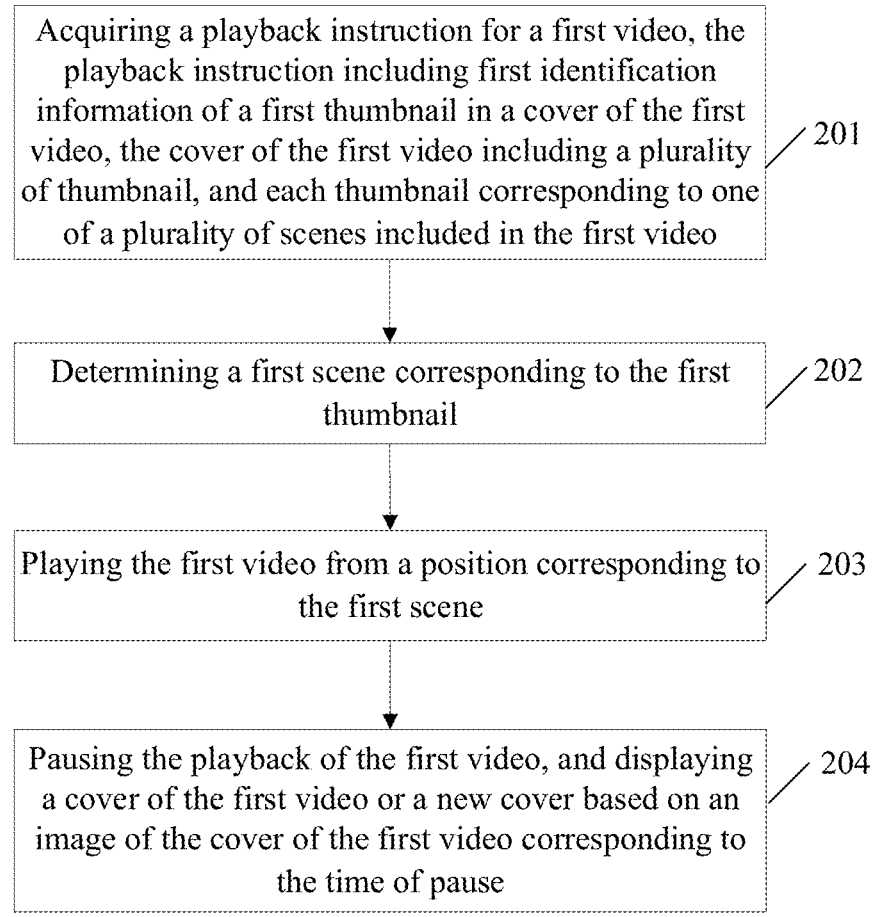
FIG. 10 is a flowchart of the control method according to an embodiment of the present disclosure.

FIG. 10 provides a flowchart of the control method according to an embodiment of the present disclosure. The control method will be described in detail below.

204, pausing the playback of the first video, and displaying a cover of the first video or a new cover based on an image of the cover of the first video corresponding to the time of pause.

In conventional technology, when the playback of the video is paused, the paused image will be displayed on the video interface. Different from the conventional technology, in the present embodiment, when the playback of the first video is paused, the cover of the first video may be displayed at least in a pause interface area of the first video. For example, at least the pause interface area of the first video may display the cover as shown in FIG. 4(*a*), FIG. 4(*b*), FIG. 5(*a*), or FIG. 5(*b*). As such, the user may flexibly locate the position of interest in the video based on the thumbnail of the scene displayed on the pause interface when the user needs to play the video again after the pause.

In some embodiments, a cover of the first video may be displayed directly in the pause interface area of the first video. Or, the cover of the first video and the thumbnail of the image corresponding to the paused time may be stitched to obtain a new cover, and the new cover with the paused image stitched together may be displayed in the pause interface area of the first video. The new cover may provide both the thumbnail of the scene that can index each scene of the video, and the image thumbnail of the image corresponding to the paused time. In particular, if the user operates on a scene thumbnail in the pause interface, the video may be positioned to the target scene corresponding to the scene thumbnail to start the playback. Further, if the user operates on the image thumbnail of the image corresponding to the paused time in the pause interface, the video may be directly played from the paused time as a starting point.

It should be noted that for the case of stitching the images at the paused time, the images at the paused time may be stitched to any position on the video cover, such as the middle position, upper left/bottom corner, right bottom/upper corner, etc. The stitching method used can be an overlay stitching (i.e., the image at the paused time covers the original cover content at its location) or a squeeze stitching (i.e., the image of the video cover may be squeeze to make the video cover vacate a certain area to accommodate the image at the paused time), which is not limited in the present embodiment.

In the present embodiment, by displaying at least the cover content of the video in the pause interface, it may be convenient for users to be able to flexibly locate the position of interest in the video based on the thumbnail of the scene displayed on the pause interface when the video needs to be played again after the pause. Further, by stitching the image thumbnail of the image corresponding to the paused time into the cover of the video, it may be convenient for users to operate the image thumbnail of the image corresponding to the paused time in the pause interface, such that the video may be played starting from the paused time.

Corresponding to the control method described above, an embodiment of the present disclosure further provides a control apparatus. The control apparatus can be applied to, but not limited to, perform playback control on video files (videos provided by applications installed on the terminal or videos stored locally on the terminal) on computers or terminal devices, such as mobile phones, tablets, personal digital assistants, etc. In a practical implementation, the processing logic of the control apparatus may be deployed in any of the foregoing terminal devices and/or a local area network/cloud server.

Figure 11:
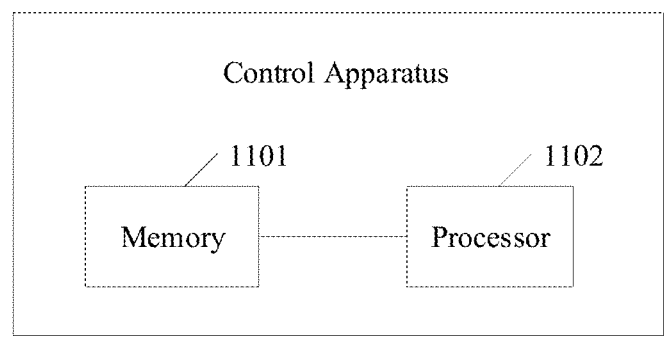
FIG. 11 is a structural diagram of the control apparatus according to an embodiment of the present disclosure.

FIG. 11 is a structural diagram of the control apparatus according to an embodiment of the present disclosure. The control apparatus includes a memory 1101 configured to store one or more sets of instruction sets, and a processor 1102 configured to call and execute the instruction sets in the memory. The processor 1102 may be configured to acquire a playback instruction for a first video, the playback instruction includes first identification information of a first thumbnail in a cover of the first video, the cover of the first video includes a plurality of thumbnail, and each thumbnail corresponds to one of a plurality of scenes included in the first video; determine a first scene corresponding to the first thumbnail; and play the first video from a position corresponding to the first scene by executing the instruction sets.

The first video may be, but is not limited to, a video file on a computer or a terminal device, such as a mobile phone, a tablet, or a personal digital assistant. For example, the video file may be a video provided by an application installed on the terminal or a video stored locally on the terminal, etc.

The scenes included in the first video may include, but are not limited to, the following types.

1) The scenes acquired by segmenting/dividing the video file based on the video image content, where each video segment acquired after segmentation/division may be used as a scene of the video.

More specifically, the image content of the video may be acquired by identifying spatial information, object (e.g., images, animals and plants, people, etc.) information, and behavior/action of objects in the video. The video file may be further segmented/divided based on the image content of the video to acquire multiple scenes of the video divided by the image content.

2) The scene acquired by segmenting/dividing the video file based on the background music of the video.

Similarly, for videos with different background music in different time periods, the video files can be segmented/divided based on the background music. More specifically, each continuous image corresponding to the same background music can be divided into the same scene, and the same background music may be, but not limited to, the same song, the same music, etc.

3) The scene acquired by segmenting/dividing the video file based on time.

Similarly, each video segment acquired after segmentation/division can be used as a scene of the video.

In some embodiments, the video may be evenly segmented/divided into multiple equal-length video segments based on a predetermined duration (of course, the duration of the last video segment may be less than or equal to the predetermined duration based on the actual duration of the video and the set duration). Each video segment may be a scene of the video. In some embodiments, the video may be randomly segmented/divided into multiple unequal length video segments, and each video segment may be used as a scene of the video.

Different from the conventional technology in which the video cover only includes a pre-designed thumbnail icon or a single image, in the present disclosure, a plurality of thumbnails corresponding to different scenes in the video may be provided in the video cover. That is, the video cover can carry thumbnails corresponding to different scenes in the video, allowing users to understand the various scenes included in the video based on the thumbnails displayed on the video cover, and at the same time, supporting user to index the corresponding scenes in the video by using the thumbnails in the video cover as an index.

As such, when the user needs to play the first video, the user can first understand the various scenes included in the first video holistically from the thumbnails corresponding to different scenes displayed in the video cover of the first video. Subsequently, a certain thumbnail, such as the first thumbnail, in the cover of the first video may be selected and operated (e.g., click, double-click, press-and-hold, etc.) based on actual requirements to trigger a playback instruction for the first video.

For the terminal device, the device side can correspondingly acquire the above-mentioned playback instruction triggered by the user by operating on the thumbnail in the first video cover. Different from the playback instruction triggered by the user by operating on the icon or cover of the video in the conventional technology, in the embodiments of the present disclosure, the playback instruction triggered by the user by operating on the first thumbnail in the first video cover may include at least the first identification information of the first thumbnail, which may include the ID (identity), number, and/or name of the first thumbnail, thereby supporting the subsequent indexing and positioning of the corresponding scene in the first video based on the thumbnail identification information in the instruction.

After acquiring the playback instruction described above, the playback instruction may be parsed to obtain the thumbnail identification information carried therein, that is, the first identification information of the first thumbnail. As such, the first scene corresponding to the first thumbnail may be determined based on the first identification information obtained through parsing, and the pre-established and stored correspondence information between the thumbnail identification and the scene.

After the first scene corresponding to the first thumbnail is determined, the first scene may be further located in the first video. Therefore, the first video may be played from the position corresponding to the first scene, and the video may no longer be played from the starting position of the video by default as in the conventional technology.

It can be seen from the above technical solution, in the control apparatus provided in the embodiment of the present disclosure, by providing a plurality of thumbnails corresponding to different scenes included in the video in the video cover, when the playback instruction carrying a certain thumbnail identification information in the video cover is acquired, the corresponding scene in the video may be located based on the thumbnail identification information carried in the playback instruction. As such, the video may be played from the located scene. It can be seen that compared with the conventional technology, the present disclosure effectively expands the cover information of a video by providing a plurality of thumbnails corresponding to different scenes of the video in the video cover, and supports users to index the corresponding scene in the video by using the thumbnails in the video cover as an index. As such, the content of the video may be richer and more comprehensive, and the playback of the video may be more flexible, convenient, and better meet the needs of the users.

The implementation and execution of the processing logic in the control apparatus described above is based on the generated video file cover and the established and stored correspondence between different thumbnails in the video cover and different scenes of the video. As such, in the present embodiment, before acquiring the playback instruction to play the first video, the processor 1102 in the above-mentioned control apparatus may be further configured to perform a pre-processing process described below.

The pre-processing process may include determining a plurality of scenes included in the first video; extracting one or more key frame images of each scene; generating a cove of the first video based on the one or more key frame images of each of the plurality of scenes; and establishing and sorting correspondence information between different thumbnails and different scenes. In some embodiments, the cover of the first video may include a thumbnail of each of the plurality of scenes, and the thumbnail of each scene may include a thumbnail of at least a portion of at least one key frame image of the scene The first video may be, but is not limited to, a video file on a computer or a terminal device such as a mobile phone, a tablet, or a personal digital assistant, such as a video file provided by an application installed on the terminal device or a video file stored locally on the terminal.

The first video may be segmented/divided based on the image content, background music, or time of the first video, and each video segment obtained by the segmentation/division may be a scene of the first video.

For the method for segmenting/dividing the first video based on the image content of the first video to obtain a scene of the first video, techniques such as basic image analysis, image processing (e.g., color analysis, grayscale analysis, image edge detection, etc.), and/or deep learning (e.g., deep learning based on convolutional network models) may be used. Pattern recognition may be performed on the video images of the first video to identify spatial information, object information (such as scenery, animals and plants, people, even text in the images, etc.) and/or behavior and movements of the objects included in the video images.

Subsequently, the first video may be further segmented based on the identified image content such as the spatial information, object information, and/or behavior and movements of the objects. In some embodiments, the first video may be divided into a plurality of video segments based on the division logic of continuous video images with high content similarity/relevance in the same scene, and each video segment may be used as a scene of the first video.

For example, assuming that each image included in video A (such as various short videos produced and uploaded by a typical user) from the starting time of $t_0$ to time $t_1$ is mainly an image of a person Person1 or a beach, each image included from time $t_1$ to time $t_2$ is mainly an image of a person Person2 or a desert, and each image included from time $t_2$ to time $t_3$ (ending time) is mainly an image of a person Person3 or ancient buildings. Based on the pattern recognition of video A, the video A can be divided into three video segments corresponding to Person1, Person2, and Person3, respectively, based on the similarity or relevance between the image contents and using the times $t_1$ and $t_2$ as the segmentation points. Alternatively, the he video A can be divided into three video segments corresponding to the beach, desert, and the ancient buildings, and each video segment may be used as a scene of the video A. As such, the video A may be divided into three scenes.

In another example, assuming that each image included in video B (such as a TV series) from the starting time $t_0$ to the time $t_1$ is a prologue image (the prologue can be identified based on the text area characteristics of the video image or the background music), from the time $t_1$ to time $t_2$, multiple images are mainly used to present scene information, from the time $t_2$ to time $t_3$, multiple images are mainly used to present the indoor plot of multiple characters, from time $t_3$ to time $t_4$, multiple images are mainly used to present the indoor plot of two characters/single character, from time $t_4$ to time $t_5$, multiple images mainly used to present the outdoor plot of two characters/single character, and from time $t_5$ to time $t_6$, images are the epilogue images. Based on the pattern recognition of video B, the video B can be divided into six video segments corresponding to the prologue, scene information, multiple characters indoor, two characters/single character indoor, two characters/single character outdoor, and epilogue, respectively, based on the similarity or relevance between the image contents and using the times $t_1$, $t_2$, $t_3$, $t_4$, $t_5$, and $t_6$ as the segmentation points, where each video segment may be used as a scene of the video B.

For the method of segmenting/dividing the first video based on the background music to obtain the scenes of the first video, in some embodiments, each continuous image corresponding to the same song or the same musical piece can be divided into the same scene.

For the method of segmenting/dividing the first video based on the time to obtain the scenes of the first video, in some embodiments, the first video can be averagely segmented/divided into multiple equal-length video segments based on a predetermined duration (of course, the duration of the last video segment can be less than or equal to the set duration, which may depend on the actual duration of the first video and the set duration). Alternatively, the first video can be randomly segmented/divided into multiple unequal-length video segments, and each video segment may be used as a scene of the first video.

It should be noted that the division methods described above for scene division of the first video are merely examples, instead of limitative descriptions, provided to describe the content of the technical solution provided in the present disclosure. When implementing the present disclosure, the first video may also be divided in other ways, which is not limited in the present disclosure.

After determining the plurality of scenes includes in the first video based on the scene division, one or more key frame images of each scene of the first video may be extracted.

The key frame image of the scene is generally an image that includes more effective information related to the scene and can directly reflect the main content of the scene. Taking the scene that is mainly used to present the indoor plot of multiple characters as an example, at least one image in the scene can be selected as a key frame image of the scene (in fact, the scene is often mixed with other images, such as indoor layout images, close-up images of one person among multiple characters, etc.). Taking the scene that is mainly used to present a photo of a character as an example, at least one image in the scene including the front face of the character may be selected as the key frame image of the scene.

In some embodiments, for each scene of the first video, the thumbnail processing of one or more key frame images of the scene may be performed first, and the thumbnails obtained after the thumbnail processing of the one or more key frame images may be stitched to obtain the thumbnail of the scene. Subsequently, thumbnails of each scene of the first video may be further stitched to obtain a cover image of the first video.

For the cover effect of the video cover generated based on the method described above, reference may be made to FIG. 4(a) and FIG. 4(b). The video cover shown in FIG. 4(a) includes a total of 9 scene thumbnails corresponding to the 9 scenes of the video, respectively, and each scene thumbnail includes a thumbnail of a key frame image. The video cover shown in FIG. 4(b) includes a total of 3 scene thumbnails, where a scene thumbnail 401 is composed of one key frame image, a scene thumbnail 402 is composed of two key frame images, and a scene thumbnail 403 is composed of 5 key frame images. Subsequently, users can perform the specified operations in any area of the corresponding scene thumbnail in FIG. 4(a) and FIG. 4(b) to achieve the indexing and positioning of the scene corresponding to the scene thumbnail, thereby realizing the play of the video from the position corresponding to the scene.

For the video cover effect shown in FIG. 4(b), in one specific implementation, a plurality of different key frame image thumbnails in the same scene thumbnail can be set to have the same indexing and positioning function. That is, users may perform the specified operation in the thumbnail area of any key frame image in the same scene thumbnail, and index and position the video to the scene position corresponding to the scene thumbnail in the video without distinction. Alternatively, a plurality of different key frame image thumbnails in the same scene thumbnail may be set to have different indexing and positioning functions. More specifically, for example, the scene corresponding to the same scene thumbnail may be further divided into multiple sub-scenes, and each key frame image thumbnail may correspond to each sub-scene. As such, users may correspondingly position different sub-scenes of the scene thumbnail corresponding to the scene by operating on different key frame image thumbnails in the same scene thumbnail. For the former implementation, since different key frame image thumbnails in the same scene have the same indexing function, each key frame image corresponding to the same scene thumbnail can be either a multi-frame continuous image adjacent in time, or a multi-frame non-continuous image with a certain time interval in the video. For the latter implementation, since different key frame image thumbnails in the same scene may have different indexing functions for indexing and positioning different sub-scenes in the corresponding scene, as such, each key frame image corresponding to the same scene thumbnail may be generally a multi-frame non-continuous image with a certain time interval. In some embodiments, an image that can directly reflect the main content of the sub-scene and include more effective information related to the sub-scene can be selected as the key frame image of the sub-scene.

In some embodiments, for each scene of the first video, a key foreground subject of the scene may also be extracted from the one or more key frame images of the scene, and the key foreground subject may be reduced to obtain a thumbnail of the scene. Subsequently, the key foreground subject in the thumbnails of each scene may be superimposed on a predetermined background image to obtain the cover of the first video.

In some embodiments, the key foreground subject may be extracted from the key frame image of the scene, such as the foreground person/animal image, the foreground car image, or the foreground building image, etc. in the key frame image based on the matting technology.

For the cover effect of the video cover generated based on the method described above, reference may be made to FIG. 5(a) and FIG. 5(b). The video cover shown in FIG. 5(a) includes a total of 7 scene thumbnails (the flowers in FIG. 5(a) are the image content of the background image) corresponding to the 7 scenes of the video, respectively, and each scene thumbnail includes a key foreground subject of a key frame image. The video cover shown in FIG. 5(b) includes a total of 3 scene thumbnails, where a scene thumbnail 501 is composed of key foreground subjects of 4 key frame images, a scene thumbnail 502 is composed of key foreground subjects of 2 key frame images, and a scene thumbnail 503 is composed of key foreground subjects of 4 key frame images. The rest of the cover is the image content provided by the background image. Subsequently, users can perform the specified operations in any area (or any key foreground subject area) of the scene thumbnail in FIG. 5(a) and FIG. 5(b) to achieve the indexing and positioning of the scene corresponding to the scene thumbnail, thereby realizing the play of the video from the position corresponding to the scene.

Similar to the two implementations corresponding to FIG. 4(b), for the video cover effect shown in FIG. 5(b), in one specific implementation, a plurality of different key foreground subjects in the same scene thumbnail can be set to have the same indexing and positioning function. That is, users may perform the specified operation in any key foreground subject area in the same scene thumbnail, and index and position the video to the scene position corresponding to the scene thumbnail in the video without distinction. Alternatively, a plurality of different key foreground subjects in the same scene thumbnail may be set to have different indexing and positioning functions. More specifically, for example, the scene corresponding to the same scene thumbnail may be further divided into multiple sub-scenes, and each key foreground subject may correspond to each sub-scene. As such, users may correspondingly position different sub-scenes of the scene thumbnail corresponding to the scene by operating on different key foreground subjects in the same scene thumbnail. For the former implementation, since different key foreground subjects in the same scene have the same indexing function, each key frame image corresponding to each key foreground subject in the same scene thumbnail can be either a multi-frame continuous image adjacent in time, or a multi-frame non-continuous image with a certain time interval in the video. For the latter implementation, since different key foreground subjects in the same scene may have different indexing functions for indexing and positioning different sub-scenes in the corresponding scene, as such, each key frame image corresponding to each key foreground subject in the same scene thumbnail may be generally a multi-frame non-continuous image with a certain time interval. In some embodiments, an image that can directly reflect the main content of the sub-scene and include more effective information related to the sub-scene can be selected as the key frame image of the sub-scene.

In other embodiments of the present disclosure, the size of the thumbnail of the scene/sub-scene in the video cover may be set based on the corresponding length of each divided scene/sub-scene in the video. In particular, in order to make it easier for users to understand the duration of each scene/sub-scene, the thumbnail size of each scene/sub-scene may be set to match the corresponding duration of the scene/sub-scene in the video. That is, the longer the duration of the scene/sub-scene in the video, the larger the corresponding thumbnail size in the video cover. Conversely, the shorter the duration of the scene/sub-scene in the video, the shorter the corresponding thumbnail size in the video cover.

FIG. 6(a) and FIG. 6(b) are example diagram of the effect of setting the size of a scene thumbnail based on a duration for the above-mentioned embodiments of FIG. 4(a) and FIG. 5(a), respectively. For the cases where the scene thumbnail further includes multiple key frame image thumbnails/multiple key foreground subject thumbnails, that is, the implementations of FIG. 4(b) and FIG. 5(b). Similar to the effect of setting the thumbnail size of the scene based on the duration shown in FIG. 6(a) and FIG. 6(b), the only difference is that after the size of the scene thumbnail is set based on the duration of the scene, the size of the thumbnail (e.g., the key frame image thumbnail or the key foreground subject thumbnail) corresponding to the sub-scene of the scene may be further set based on the duration of the sub-scene, the diagrams of which are not shown in the present disclosure.

In addition, in some embodiments, it may not be necessary to set the size of the scene/sub-scene thumbnail in the video cover based on the duration, but to mark the specific duration of the scene/sub-scene in the thumbnail area of each scene/sub-scene, such as 10' (10 minutes), 10'56" (10 minutes and 56 seconds). This method can also provide users with the duration information of the scene/sub-scene in the video cover. Of course, the two methods described above can also be combined, that is, on the basis of setting the size of the scene/sub-scene thumbnail in the video cover based on the duration, the specific duration corresponding to the scene/sub-scene may be further marked in the thumbnail area of each scene/sub-scene.

Based on the duration information display method described above, users can not only understand the relevant content information of each scene in the video through the thumbnails of the key frame images/key foreground subjects shown in the video cover, but also use the thumbnail size of the scene/sub-scene in the video cover to understand the duration information of the scene/sub-scene in the video.

The foregoing thumbnail display method or duration information display method provided in the previous embodiments are merely exemplary descriptions to clearly describe the technical solution of the present disclosure. The specific implementation of the present disclosure is not limited to the foregoing implementation methods shown in the present disclosure.

After generating the video cover including a plurality of scene/sub-scene thumbnails for the first video, the correspondence information between thumbnails of different scenes/sub-scenes and different scenes/sub-scenes included in the video cover may be further established, and the correspondence information of the established thumbnails and scenes/sub-scenes may be stored. Subsequently, after the playback instruction for the first video is triggered for the thumbnail in the video cover, the "playback position corresponding to the playback instruction to play the video" can be positioned in the first video based on the established and stored correspondence information.

The correspondence information may include, but is not limited to, a correspondence between a thumbnail identifier, such as a thumbnail ID, a number, and/or a name, and a scene identifier, such as a scene ID, a number, and/or a name.

Further, for the implementations corresponding to FIG. 4(a) and FIG. 5(a) described above, since each scene thumbnail in the video cover includes only one key frame image thumbnail or one key foreground subject thumbnail, it may be possible to specifically establish and store the correspondence information between "the scene thumbnail identifier and/or thumbnail identifier of key frame images in the scene thumbnails" and the scene identifier, or establish and store the correspondence information between "the scene thumbnail identifier and/or thumbnail identifier of key foreground subjects in the scene thumbnails" and the scene identifier.

For the implementations corresponding to FIG. 4(a) and FIG. 5(a) described above, for the implementation of the same index function for multiple different key frame image/key foreground subject thumbnails in the same scene thumbnail, the correspondence information between "the scene thumbnail identifier and/or thumbnail identifier of any one or more key frame images in the scene thumbnail" and the scene identifier can be established and stored. Alternatively, the correspondence information between "the scene thumbnail identifier and/or thumbnail identifier of any one or more key foreground subjects in the scene thumbnail" and the scene identifier can be established and stored. For the implementation of different indexing functions (indexed to different sub-scenes of the scene) for thumbnails of different key frame images/key foreground subjects in the same scene thumbnail, in some embodiments, a secondary index structure of the "thumbnail-scene" may be established and stored. In particular, the primary index may include the correspondence information between the scene thumbnail identifier and the scene identifier, the secondary index may include the correspondence information between the thumbnail identifier (or the thumbnail identifier of different key foreground subjects) of different key frame images in different scene thumbnails and different sub-scene identifiers.

By using the processing method described in the present embodiment, a cover including multiple scene thumbnails may be generated for the video in advance, and the corresponding relationship between each thumbnail in the video cover and the video scene may be established, which may effectively expand the cover information of the video. Users may learn more about the video file through the video cover. The video cover may support the user to index the corresponding scene in the video by using the thumbnail in the video cover as an index, such that users may quickly position the position of interest in the video.

The following embodiment provides a specific implementation process of the processor 1102 in the control apparatus playing the first video from a position corresponding to the first scene.

In one implementation method, the processor may implement the playback of the video from a position corresponding to the first scene by playing the first video from a starting position of the first scene.

After the first video is divided into multiple scenes, each scene in the first video may correspond to a starting position and an ending position (or it may be called the starting time and the ending time). After obtaining the playback instruction for the first video and determining the first scene corresponding to the first thumbnail identification information carried in the playback instruction, in some embodiments, the video playback action in response to the playback instruction may be indexed to the starting position of the first scene in the first video. That is, the first video may be played from the starting position of the first scene, and the part before the starting position of the first scene may be skipped.

In another implementation method, the processor 1102 may further implement the playback of the first video from a position corresponding to the first scene by playing the first video from a position in the first scene corresponding to a first thumbnail; each thumbnail included in the cover of the first video may be a thumbnail of at least a part of a key frame image in a corresponding scene of the first video.

Based on the foregoing description, it can be known that the thumbnail of at least part of the key frame image in the corresponding scene of the first video may be the thumbnail of the key frame image in the scene of the first video, or the thumbnail of the key foreground subject extracted from the key frame image. Therefore, each thumbnail included in the cover of the first video (which does not refer to the macro-level scene thumbnail) may correspond to a corresponding key frame image in the first video. Correspondingly, each thumbnail may also correspond to a corresponding image position/time position in the first video. Based on this characteristic, when a playback instruction is obtained and a target scene (i.e., the first scene) corresponding to the first thumbnail identification information carried in the playback instruction is determined, that is, the video playback action in response to the playback instruction may also be indexed to a position corresponding to the first thumbnail in the first scene. That is, the first video may be played from the image position/time position corresponding to the first thumbnail in the first scene, and the part before the image position/time position of the first thumbnail may be skipped.

In yet another implementation method, the processor 1102 may also play the first video from a position corresponding to the first scene by playing each target scene in the first video from a position corresponding to the first scene; the target scene may include the first scene and each second scene in the first video meeting a predetermined association condition with the first scene.

The predetermined association condition may be, but is not limited to, a condition capable of indicating that the content has high similarity or relevance with the content of the first scene. In some embodiments, for example, if the second scene and the first scene belong to the same/similar category of scenes (e.g., the second scene and the first scene may be image display scenes of the same/similar person, or the second scene and the first scene may be both scene display scenes or war display scenes, etc.), the second scene may be determined to have a high similarity or relevance to the first scene.

In the two implementation methods provided in the foregoing embodiments of FIG. 7 and FIG. 8, when the first video is played in response to the playback instruction, the part of first video after the position may be continuous played without selection starting from the positioned position (e.g., the starting position of the positioned scene or the position of the thumbnail operated in the first video when the playback instruction is triggered). In the present embodiment, starting from the positioned position (which can also be the starting position of the positioned scene or the position of the thumbnail operated in the first video when the playback instruction is triggered), the first scene positioned in the first video and each second scene that meets the associated conditions of the first scene may be selectively played.

The method of selecting each second scene in the first video that meets the associated conditions with the first scene and selectively playing the first scene and each second scene is essentially a skipping playback of the first video. That is, the related scenes in the first video may be automatically connected and played back on the skipping method.

This playback method may be convenient for users to locate one scene of the video and continuously watch (starting with the located scene) other scenes (such as scenes of the same/similar category, etc.) in the video that are associated with the located scene. For example, assuming that a small video includes a plurality of images of character A from time t0 to t1 (corresponding to scene P1), a plurality of images of character B from time t1 to t2 (corresponding to scene P2), a plurality of images of character A from time t2 to t3 (corresponding to scene P3), and a plurality of images of character B from time t3 to t4 (corresponding to scene P4). Based on the present embodiment, after the user triggers a playback instruction on the video by operating on the thumbnail corresponding to the scene Pc on the cover of the video, in response to the playback instruction, playback may start from the position corresponding to scene P2, and after playback of scene P2 is completed, skip to the position of scene P4 to further play scene P4. That is, the similar scenes P2 and P4 may be screened, and the screened similar scenes P2 and P4 may be sequentially played using the skipping method. In another example, a video of a TV episode may include multiple non-continuous scenery scenes and multiple non-continuous character scenes. After the user triggers a playback instruction on the video by operating on the thumbnail corresponding to a scenery scene S1 on the cover of the video, in response to the playback instruction, starting from the scenery scene S1, the scenery scenes after S1 in the video may be played.

Based on the various positioning methods of the playback position provided in the present embodiment described above, the user may use the thumbnail in the video cover as an index to index the playback action of the video to the corresponding position of the desired scene, such that the use may quickly locate the position of interest in the video.

In some embodiments, the processor 1102 may be configured to pause the playback of the first video, and display a cover of the first video or a new cover based on an image of the cover of the first video corresponding to the time of pause.

In conventional technology, when the playback of the video is paused, the paused image will be displayed on the video interface. Different from the conventional technology, in the present embodiment, when the playback of the first video is paused, the cover of the first video may be displayed at least in a pause interface area of the first video. For example, at least the pause interface area of the first video may display the cover as shown in FIG. 4(*a*), FIG. 4(*b*), FIG. 5(*a*), or FIG. 5(*b*). As such, the user may flexibly locate the position of interest in the video based on the thumbnail of the scene displayed on the pause interface when the user needs to play the video again after the pause.

In some embodiments, a cover of the first video may be displayed directly in the pause interface area of the first video. Or, the cover of the first video and the thumbnail of the image corresponding to the paused time may be stitched to obtain a new cover, and the new cover with the paused image stitched together may be displayed in the pause interface area of the first video. The new cover may provide both the thumbnail of the scene that can index each scene of the video, and the image thumbnail of the image corresponding to the paused time. In particular, if the user operates on a scene thumbnail in the pause interface, the video may be positioned to the target scene corresponding to the scene thumbnail to start the playback. Further, if the user operates on the image thumbnail of the image corresponding to the paused time in the pause interface, the video may be directly played from the paused time as a starting point.

It should be noted that for the case of stitching the images at the paused time, the images at the paused time may be stitched to any position on the video cover, such as the middle position, upper left/bottom corner, right bottom/upper corner, etc. The stitching method used can be an overlay stitching (i.e., the image at the paused time covers the original cover content at its location) or a squeeze stitching (i.e., the image of the video cover may be squeeze to make the video cover vacate a certain area to accommodate the image at the paused time), which is not limited in the present embodiment.

In the present embodiment, by displaying at least the cover content of the video in the pause interface, it may be convenient for users to be able to flexibly locate the position of interest in the video based on the thumbnail of the scene displayed on the pause interface when the video needs to be played again after the pause. Further, by stitching the image thumbnail of the image corresponding to the paused time into the cover of the video, it may be convenient for users to operate the image thumbnail of the image corresponding to the paused time in the pause interface, such that the video may be played starting from the paused time.

It should be noted that the various embodiments in the present specification are described in a progressive manner, and each embodiment focuses on differences from other embodiments, and the same similar parts between the various embodiments can be referred to each other.

For the convenience of description, when describing the above system or device, the function is divided into various modules or units and described separately. Of course, when implementing the embodiments of the present disclosure, the function of each unit may be implemented in the same or multiple software and/or hardware.

A method according to the embodiments of the disclosure can be realized by means of software plus a hardware platform, or can be realized by a hardware platform. Embodiments of the present disclosure can be implemented in the form of a software product stored in a storage medium (such as ROM, RAM, magnetic disc, or optical disc), which may include a number of instructions for enabling an electronic device, e.g., a mobile phone, a computer, a server, an air conditioner, or a network device, or the like, to perform a method consistent with the disclosure, such as one of the methods described above.

The terms "first," "second," "third," "fourth," or the like in the specification are merely used to distinguish an entity or an operation from another entity or operation, and are not intended to require or indicate that there is any such physical relationship or sequence between these entities or operations. In addition, the terms "including," "comprising," and variants thereof herein are open, non-limiting terminologies, which are meant to encompass a series of elements of processes, methods, items, or devices. Not only those elements, but also other elements that are not explicitly listed, or elements that are inherent to such processes, methods, items, or devices. In the absence of more restrictions, the elements defined by the statement "include a/an . . . " not preclude that other identical elements are included in the processes, methods, items, or devices that include the elements.

The embodiments disclosed herein are merely examples. Other applications, advantages, alternations, or modifications of, or equivalents to the disclosed embodiments are obvious to a person skilled in the art and are intended to be encompassed within the scope of the present disclosure.

What is claimed is:

1. A control method, comprising:
   determining a plurality of scenes included in a first video;
   extracting a key foreground subject of each scene of the plurality scenes from one or more key frame images of each scene;
   performing thumbnail processing on the key foreground subject to obtain the thumbnail of each scene by establishing and storing correspondence information between the respective thumbnails and scenes;
   superimposing the key foreground subject in the thumbnail of each scene on a background image to obtain the cover to the first video;
   acquiring a playback instruction for the first video triggered by operating on a first thumbnail in a cover of the first video, the playback instruction including first identification information of the first thumbnail in the cover of the first video, the cover of the first video including a plurality of thumbnails, and each thumbnail corresponding to one of a plurality of scenes included in the first video;
   determining a first scene corresponding to the first thumbnail; and
   playing the first video from a position corresponding to the first scene.

2. The method of claim 1, wherein playing the first video from the position corresponding to the first scene includes:
   playing the first video from a starting position of the first scene; or
   playing the first video from the position in the first scene corresponding to the first thumbnail, each thumbnail included in the cover of the first video being a thumbnail of at least a part of a key frame image in each scene of the first video.

3. The method of claim 1, wherein playing the first video from the position corresponding to the first scene includes:
   playing each target scene in the first video from the position corresponding to the first scene, the target scene including the first scene and each second scene in the first video meeting an association condition with the first scene.

4. The method of claim 1, wherein generating the cover of the first video includes:
   performing thumbnail processing on the one or more key frame images of each scene;
   stitching thumbnails of the one or more key frame images after the thumbnail processing to obtain the thumbnails of the scene; and
   stitching thumbnails of each scene to obtain the cover of the first video.

5. The method of claim 4, wherein:
   a thumbnail size of each scene included in the cover of the first video matches a duration of the scene in the first video.

6. The method of claim 1, further comprising:
   displaying the cover of the first video or displaying a new cover generated based on an image of the cover of the first video corresponding to a time of pause in response to the playback of the first video being paused.

7. A control apparatus, comprising:
   a processor; and
   a memory storing one or more sets of instruction sets that, when executed by the processor, causes to the processor to:
   determine a plurality of scenes included in a first video;

extract a key foreground subject of each scene of the plurality scenes from one or more key frame images of each scene;

perform thumbnail processing on the key foreground subject to obtain the thumbnail of each scene by establishing and storing correspondence information between the respective thumbnails and scenes;

superimpose the key foreground subject in the thumbnail of each scene on a background image to obtain the cover to the first video;

acquire a playback instruction for a first video upon triggered by operating on a first thumbnail in a cover of the first video, the playback instruction including first identification information of the first thumbnail in the cover of the first video, the cover of the first video including a plurality of thumbnails, and each thumbnail corresponding to one of a plurality of scenes included in the first video;

determine a first scene corresponding to the first thumbnail; and play the first video from a position corresponding to the first scene.

8. The apparatus of claim 7, wherein before acquiring the playback instruction for the first video, the instruction sets further causes the processor to:

determine the plurality of scenes included in the first video;

extract one or more key frame images of each scene;

generate the cover of the first video based on one of more key frame images of each of the plurality of scenes, the cover of the first video including thumbnails of each of the plurality of scenes, and the thumbnail of each scene including at least a partial thumbnail of one or more key frame images of the scene; and establish and store correspondence information between different thumbnails and different scenes.

9. A computer readable medium containing program instructions for causing a computer to perform the method of:

determining a plurality of scenes included in a first video;

extracting a key foreground subject of each scene of the plurality scenes from one or more key frame images of each scene;

performing thumbnail processing on the key foreground subject to obtain the thumbnail of each scene by establishing and storing correspondence information between the respective thumbnails and scenes;

superimposing the key foreground subject in the thumbnail of each scene on a background image to obtain the cover to the first video acquiring a playback instruction for a first video, triggered by operating on a first thumbnail in a cover of the first video, the playback instruction including first identification information of a first thumbnail in a cover of the first video, the cover of the first video including a plurality of thumbnails, and each thumbnail corresponding to one of a plurality of scenes included in the first video;

determining a first scene corresponding to the first thumbnail; and playing the first video from a position corresponding to the first scene.

10. The computer readable medium of claim 9, wherein playing the first video from the position corresponding to the first scene includes:

playing the first video from a starting position of the first scene; or playing the first video from the position in the first scene corresponding to the first thumbnail, each thumbnail included in the cover of the first video being a thumbnail of at least a part of a key frame image in each scene of the first video.

11. The computer readable medium of claim 9, wherein playing the first video from the position corresponding to the first scene includes:

playing each target scene in the first video from the position corresponding to the first scene, the target scene including the first scene and each second scene in the first video meeting an association condition with the first scene.

* * * * *